US012180772B2

(12) United States Patent
Lai et al.

(10) Patent No.: US 12,180,772 B2
(45) Date of Patent: Dec. 31, 2024

(54) DOOR CLOSER

(71) Applicant: NINGBO PENTAGON DAMPER CORPORATION, Zhejiang (CN)

(72) Inventors: Mingliang Lai, Ningbo (CN); Feifei Zhang, Ningbo (CN); Jing Zhang, Beijing (CN)

(73) Assignee: NINGBO PENTAGON DAMPER CORPORATION, Ningbo (CN)

( * ) Notice: Subject to any disclaimer, the term of this patent is extended or adjusted under 35 U.S.C. 154(b) by 1 day.

(21) Appl. No.: 18/164,565

(22) Filed: Feb. 3, 2023

(65) Prior Publication Data

US 2023/0184017 A1 Jun. 15, 2023

Related U.S. Application Data

(63) Continuation of application No. PCT/CN2021/110861, filed on Aug. 5, 2021.

(30) Foreign Application Priority Data

Aug. 5, 2020 (CN) ........................ 202010775584.5

(51) Int. Cl.

*E05F 3/10* (2006.01)
*E05F 1/12* (2006.01)
*E05F 3/20* (2006.01)

(52) U.S. Cl.

CPC .............. *E05F 3/10* (2013.01); *E05F 1/1253* (2013.01); *E05F 3/20* (2013.01); *E05Y 2201/21* (2013.01);

(Continued)

(58) Field of Classification Search

CPC .. E05F 3/10; E05F 1/1253; E05F 3/20; E05Y 2201/21; E05Y 2201/254; E05Y 2201/264;

(Continued)

(56) References Cited

U.S. PATENT DOCUMENTS 2,437,192 A * 3/1948 Glanz ........................ E05F 3/20 16/50
8,627,547 B2 * 1/2014 Soh ........................ E05F 1/1253 439/31

(Continued)

FOREIGN PATENT DOCUMENTS

CN 104832024 A 8/2015
CN 206329200 U 7/2017

(Continued)

OTHER PUBLICATIONS

Office Action issued on Oct. 13, 2020 in Chinese Patent Application No. 202010775584.5 and English machine translation.

(Continued)

*Primary Examiner* — Christine M Mills
*Assistant Examiner* — Matthew J Sullivan
(74) *Attorney, Agent, or Firm* — MILLBURN IP PLLC

(57) ABSTRACT

A door closer is provided. The door closer includes a first connecting plate and a second connecting plate. The first connecting plate is connectable to an external door frame, the second connecting plate is connectable to a door body connecting portion. Connecting rod assemblies and return springs are mounted in the door body connecting portion. One end of the connecting rod assembly passes through the second connecting plate and is hinged to the first connecting plate. When a door is opened, an external door body drives the first connecting plate and the second connecting plate to overturn, and after the connecting rod assembly pulls the door body connecting portion, the return spring is compressed. When the door is closed, the return spring pulls the door body to close automatically.

16 Claims, 14 Drawing Sheets

(52) U.S. Cl.
CPC ... *E05Y 2201/254* (2013.01); *E05Y 2201/264* (2013.01); *E05Y 2201/474* (2013.01); *E05Y 2201/628* (2013.01); *E05Y 2201/638* (2013.01); *E05Y 2600/46* (2013.01); *E05Y 2800/404* (2013.01); *E05Y 2900/132* (2013.01)

(58) Field of Classification Search
CPC ......... E05Y 2201/474; E05Y 2201/628; E05Y 2201/638; E05Y 2600/46; E05Y 2600/41; E05Y 2600/42; E05Y 2800/404; E05Y 2900/132
See application file for complete search history.

(56) References Cited

U.S. PATENT DOCUMENTS

| | | | | |
|---|---|---|---|---|
| 8,650,713 | B2 * | 2/2014 | Migliorini | E05D 11/1021 16/370 |
| 9,803,410 | B2 * | 10/2017 | Miglioranzo | E05F 3/20 |
| 10,309,137 | B2 * | 6/2019 | Wu | F16M 11/10 |
| 10,443,285 | B2 * | 10/2019 | Fang | E05F 1/1261 |
| 10,472,870 | B2 * | 11/2019 | Tassi | E05F 3/10 |
| 10,563,439 | B2 * | 2/2020 | Miglioranzo | E05D 7/04 |
| 10,927,580 | B2 * | 2/2021 | Daniels | E05D 7/0009 |
| 11,136,806 | B2 * | 10/2021 | Kuramochi | E05F 1/08 |
| 11,542,738 | B2 * | 1/2023 | Daniels | E05F 3/108 |
| 11,906,747 | B1 * | 2/2024 | Bobuk | F16F 1/06 |
| 11,965,369 | B2 * | 4/2024 | Ferrari | E05D 7/04 |
| 2019/0071904 | A1 * | 3/2019 | Migliorini | E05D 7/0415 |
| 2020/0048944 | A1 * | 2/2020 | Stefan | E05F 1/1253 |
| 2020/0255116 | A1 * | 8/2020 | Chadwell | E05D 3/12 |
| 2022/0275671 | A1 * | 9/2022 | Salice | E05D 5/046 |
| 2023/0151659 | A1 * | 5/2023 | Liermann | E05D 7/0045 16/233 |
| 2023/0151661 | A1 * | 5/2023 | Liermann | E05D 7/0423 16/221 |
| 2023/0340822 | A1 * | 10/2023 | Salice | E05D 3/142 |
| 2023/0349213 | A1 * | 11/2023 | Salice | E05D 5/02 |
| 2023/0417095 | A1 * | 12/2023 | Anselmi | E05F 1/1025 |

FOREIGN PATENT DOCUMENTS

| | | | |
|---|---|---|---|
| CN | 207749960 | U | 8/2018 |
| CN | 111734246 | A | 10/2020 |
| DE | 202020100939 | U1 | 2/2020 |
| GB | 2446894 | A | 8/2008 |

OTHER PUBLICATIONS

Office Action issued on Oct. 28, 2020 in Chinese Patent Application No. 202010775584.5 and English machine translation.
Office Action issued on Nov. 6, 2020 in Chinese Patent Application No. 202010775584.5 and English machine translation.
International Search Report and Written Opinion issued on Nov. 4, 2021, in PCT/CN2021/110861, and English translations thereof.

* cited by examiner

DOOR CLOSER

CROSS-REFERENCE TO RELATED APPLICATIONS

This application is a continuation of International Application No. PCT/CN2021/110861, filed on Aug. 5, 2021, which claims priority to Chinese Patent Application No. CN 202010775584.5, filed on Aug. 5, 2020. The contents of the above-referenced applications are incorporated herein by reference.

TECHNICAL FIELD

The present disclosure relates to the technical field of door body hinges, and particularly relates to a door closer.

BACKGROUND

A traditional door hinge is a folding hinge; after being hinged, a main hinge and a vice hinge are fixedly mounted on a door frame and a door plate, which cannot play a cushioning role when closing a door and further cannot control the door closing speed. When a door is closed, if there is a greater external force, the door plate and the door frame will collide violently and make a large sound, and the violent collision will easily cause excessive interaction force between the door plate and the door frame, which will easily cause damage to the door plate or the door frame, affecting the service life of the door frame and the door plate, and there is a certain safety hazard. In order to avoid the above-mentioned defects of the folding hinge, a door hinge having a cushioning effect when closing a door have gradually emerged in the market, that is, a door closer (or a door closing device, a door closing assembly).

However, most of the door closers in the prior art use straight push type buffers, one-way dampers, spiral structures and hydraulic mechanisms to close the door with a buffering effect. According to the straight push type buffer, the door needs to be punched for mounting, mounting is complicated, and the application range is limited. The one-way damper works for a long time in the door closing stroke, when the door is closed frequently, the life cycle of the one-way damper will be reached, consequently leading to the loss of the door closing buffer function. A buffer hinge using the spiral structure is complex in structure and more difficult to process, and has no door stop function. An existing door closer using a buffer hinge of the hydraulic mechanism often has the oil leakage problem, and the door stop function is not set.

SUMMARY OF THE DISCLOSURE

(I) Technical Problem to be Solved

The technical problem to be solved by the present disclosure is to provide a door closer, so as to solve the problems that a door closer in the prior art has a single function and cannot play a buffering protection role in a door body.

(II) Technical Solution

In order to solve the above-mentioned technical problem, the present disclosure provides a door closer, including a first connecting plate and a second connecting plate. The first connecting plate and the second connecting plate are disposed in a hinged mode. A door body connecting portion is fixed to the second connecting plate. The door body connecting portion is used for connecting an external door body. The first connecting plate is used for connecting a door frame, a hydraulic rod, connecting rod assemblies and return springs are mounted in the door body connecting portion. A connecting seat is fixed to the first connecting plate. One end of the connecting rod assembly passes through a hinge and then is fixed to the connecting seat. When the first connecting plate and the second connecting plate are opened, the connecting rod assembly is pulled. The door body connecting portion further includes a housing and guide sliding blocks symmetrically mounted at one end of the housing. The guide sliding block serves to guide the sliding of the connecting rod assembly. A base is fixed to the other end of the housing, the hydraulic rod, the connecting rod assembly and the return spring are all mounted on the base. The hydraulic rod and the return spring are respectively placed on two sides of the connecting rod assembly. The connecting rod assembly is divided into a curved rod, a connecting rod and a hinged seat. The hinged seat is mounted on the base. The connecting rod is hinged to the hinged seat. One end of the curved rod is hinged to the connecting rod, and the other end of the curved rod is connected to the connecting seat. When a door is opened, the external door body drives the first connecting plate and the second connecting plate to overturn, and the curved rod slides along the guide sliding block under the action of the first connecting plate, so that the base is pulled by the connecting rod to move, further driving the hydraulic rod and the return spring to contract.

Further, rolling bearings are symmetrically mounted at the joint of the curved rod and the connecting rod. A guide groove is disposed on the guide sliding block. The rolling bearing is placed in the guide groove. An arc-shaped guide surface is disposed on the guide groove. A positioning boss is further disposed on the guide sliding block. An arc-shaped surface is disposed on the positioning boss, which has the function of strengthening positioning to prevent the door body from shaking. When the door is opened, the rolling bearing slides along the guide groove, and the arc-shaped guide surface will drive the rolling bearing to deflect downwards, so as to be clamped on the positioning boss, which has the function of positioning, and the opened door body can be automatically positioned. After overcoming the limit of the positioning boss by an external force, the rolling bearing can return into the guide groove, at this moment, the return spring drives the hinge to return, the door body is automatically closed under the pulling of the hinge, and the hydraulic rod can provide a resistance, which plays a buffering role, so as to avoid the colliding damage of the door body.

Further, a through hole is disposed on the guide sliding block, one end of the hydraulic rod and one end of the return spring are placed in the through hole. Through grooves are symmetrically disposed on the first connecting plate and the second connecting plate, and the curved rod passes through the through groove and then is connected to the connecting seat.

Further, a first bending portion and a second bending portion are respectively disposed at two ends of the curved rod. The first bending portion and the second bending portion are respectively connected to the connecting seat and the connecting rod. A speed regulating switch is disposed on the hydraulic rod, and the speed regulating switch can regulate the telescopic speed of the hydraulic rod so as to control the resistance provided by the hydraulic rod.

Further, the return spring is disposed on both sides of the hydraulic rod. The connecting rod assembly is symmetrically disposed on two sides of the housing. A first cavity is disposed on the housing, second cavities are symmetrically disposed on two sides of the first cavity. The hydraulic rod is placed in the first cavity. The return spring is placed in the second cavity. A sliding groove is further disposed on the housing, and the base is placed in the sliding groove.

Further, a second guide sliding block is further disposed between the guide sliding blocks, and the guide groove is disposed on both sides of the second guide sliding block.

(III) Beneficial Effect

According to a door closer of the present disclosure, a first connecting plate and a second connecting plate of the door closer are respectively provided with a connecting seat and a door body connecting portion which are respectively fixed in a door frame and a door body. A hinge is disposed in a hidden mode, which does not affect the aesthetic appearance of the door body. The connecting seat and the door body connecting portion are connected via connecting rod assemblies. When the door body is opened, a connecting rod is driven to move. At the same time, the connecting rod drives a hydraulic rod and spring to contract via a base. A positioning boss for positioning is further disposed on a guide sliding block, so that the opened door body can be fixed. When a door is closed, the hydraulic rod and the spring expand, which can drive the door body to close automatically.

Wherein: 1 is a hydraulic rod, 2 is a return spring, 3 is a first connecting plate, 4 is a second connecting plate, 5 is a connecting seat, 6 is a housing, 7 is a guide sliding block, 8 is a base, 9 is a curved rod, 10 is a connecting rod, 11 is a hinged seat, 12 is a rolling bearing, 13 is a guide groove, 14 is an arc-shaped guide surface, 15 is a positioning boss, 16 is a through hole, 17 is a through groove, 18 is a first bending portion, 19 is a second bending portion, 20 is a speed regulating switch, 21 is a first cavity, 22 is a second cavity, 23 is a sliding groove, and 24 is a second guide sliding block.

DETAILED DESCRIPTION

Embodiment I

Figure 1:
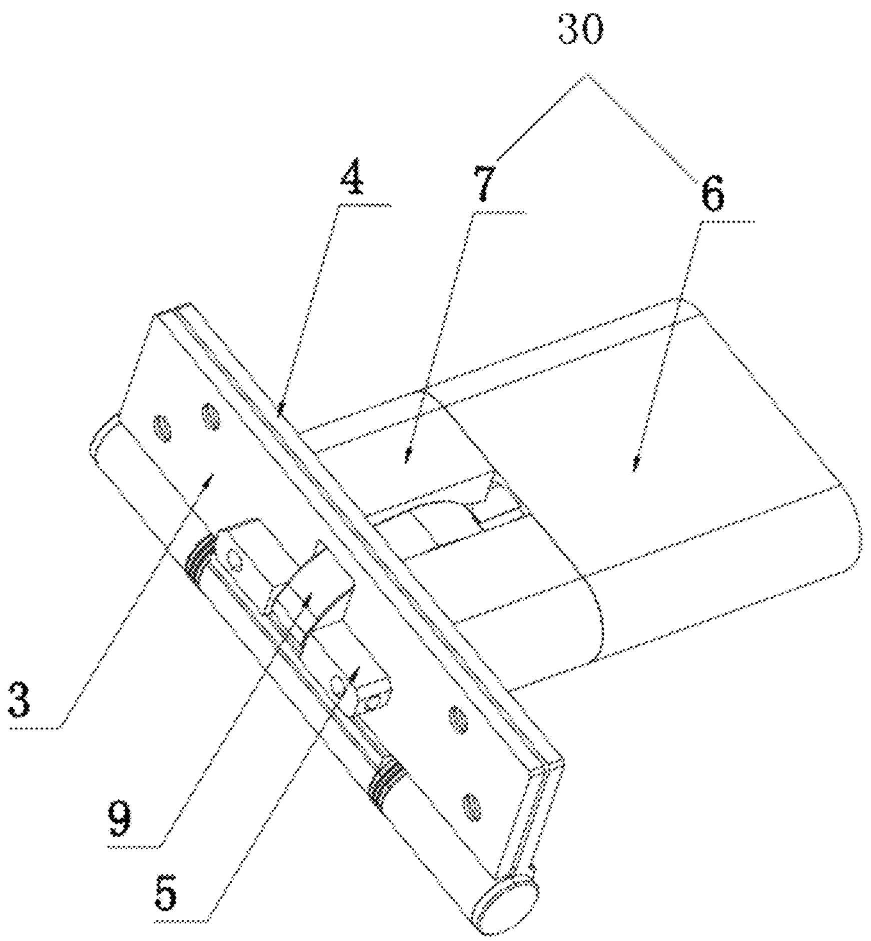
FIG. 1 is a stereogram of Embodiment I of a door closer of the present disclosure in a closed state.
Figure 2:
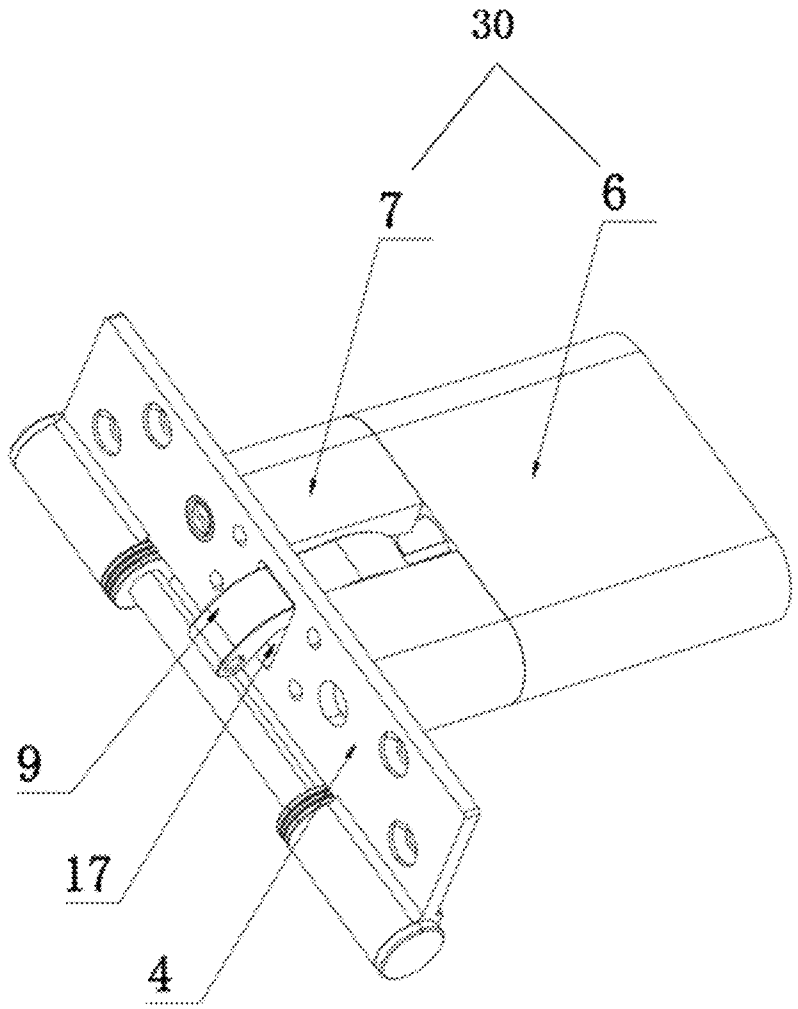
FIG. 2 is a stereogram of Embodiment I of the door closer of the present disclosure with a first connecting plate removed.

With reference to FIG. 1 to FIG. 9, in order to solve the above-mentioned technical problem, the present disclosure provides a door closer, including a first connecting plate 3 and a second connecting plate 4, wherein a door body connecting portion 30 is fixed to the second connecting plate 4; with reference to FIG. 1 and FIG. 2, a hydraulic rod 1, connecting rod assemblies and return springs 2 are mounted in the door body connecting portion 30; the first connecting plate 3 and the second connecting plate 4 are disposed in a hinged mode; a connecting seat 5 is fixed to the first connecting plate 3, wherein the first connecting plate 3 is connected to a door frame via the connecting seat 5; the second connecting plate 4 is connected to an external door body via the door body connecting portion 30; one end of the connecting rod assembly passes through the first connecting plate 3 and the second connecting plate 4 and then is fixed to the connecting seat 5; after the door body is opened, the first connecting plate 3 and the second connecting plate 4 will drive the connecting rod assembly to move; and after the connecting rod assembly moves, the hydraulic rod 1 and the return spring 2 are driven to contract.

Figure 3:
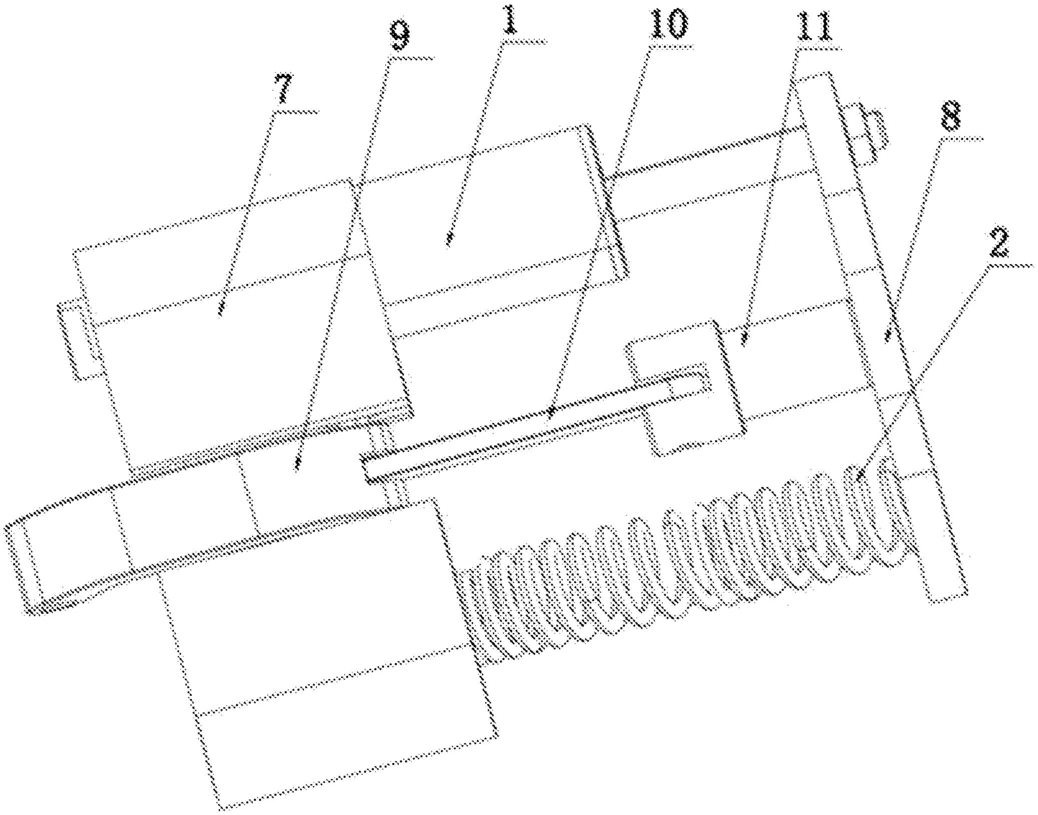
FIG. 3 is a stereogram of an internal structure of a door body connecting portion in Embodiment I of the door closer of the present disclosure.
Figure 4:
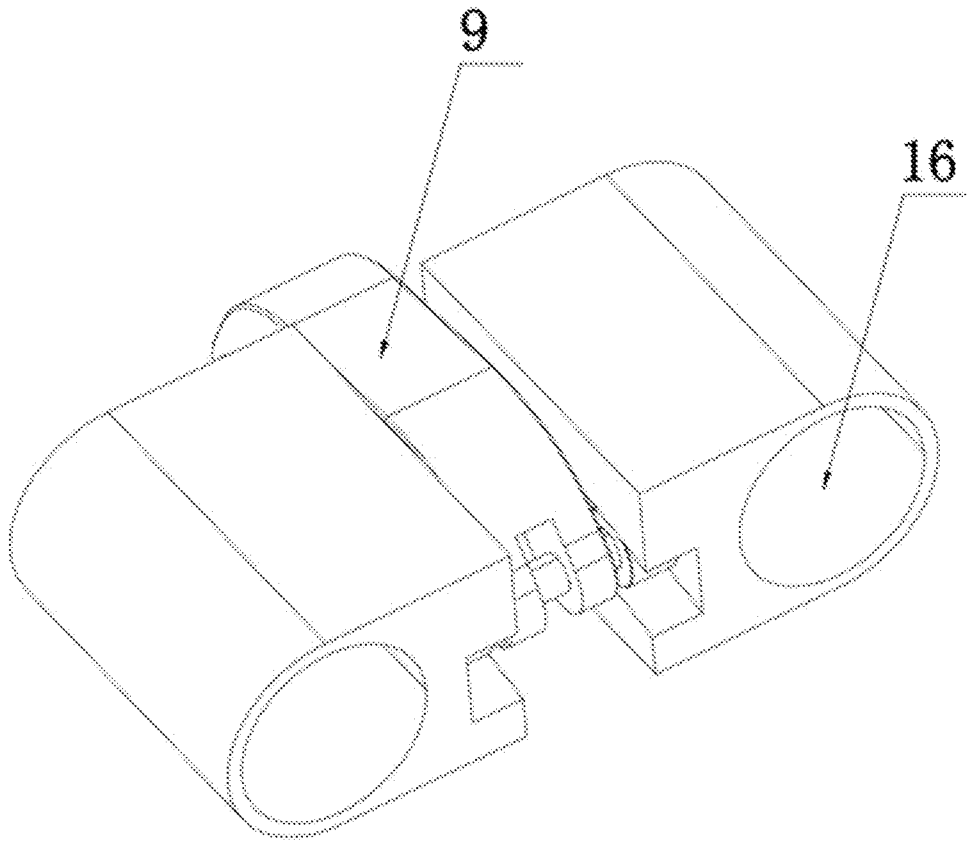
FIG. 4 is a stereogram of a guide sliding block and a curved rod in Embodiment I of the door closer of the present disclosure.
Figure 5:
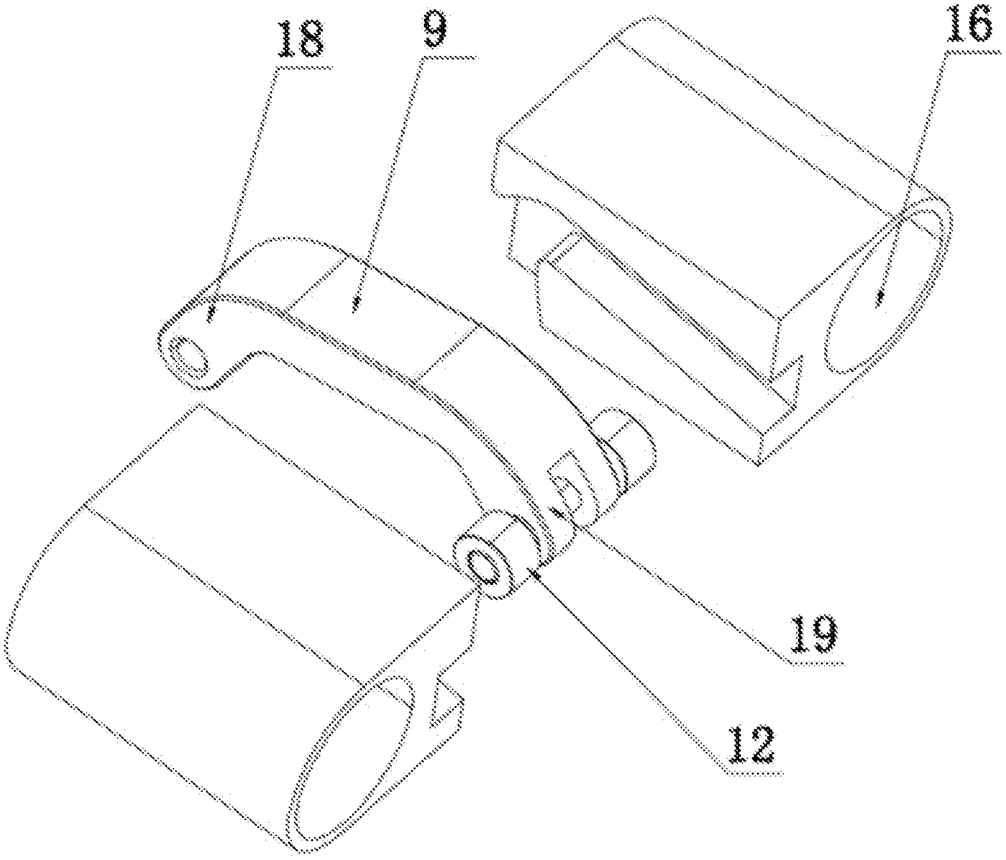
FIG. 5 is an exploded view of the guide sliding block and the curved rod in Embodiment I of the door closer of the present disclosure.
Figure 6:
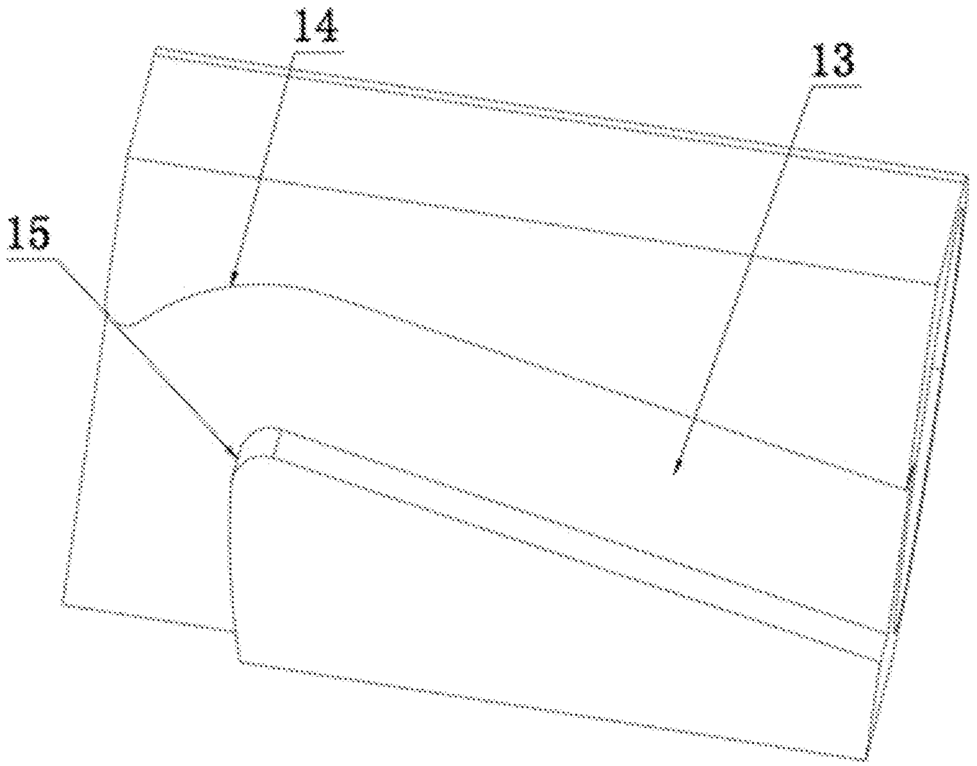
FIG. 6 is a stereogram of the guide sliding block in Embodiment I of the door closer of the present disclosure.
Figure 7:
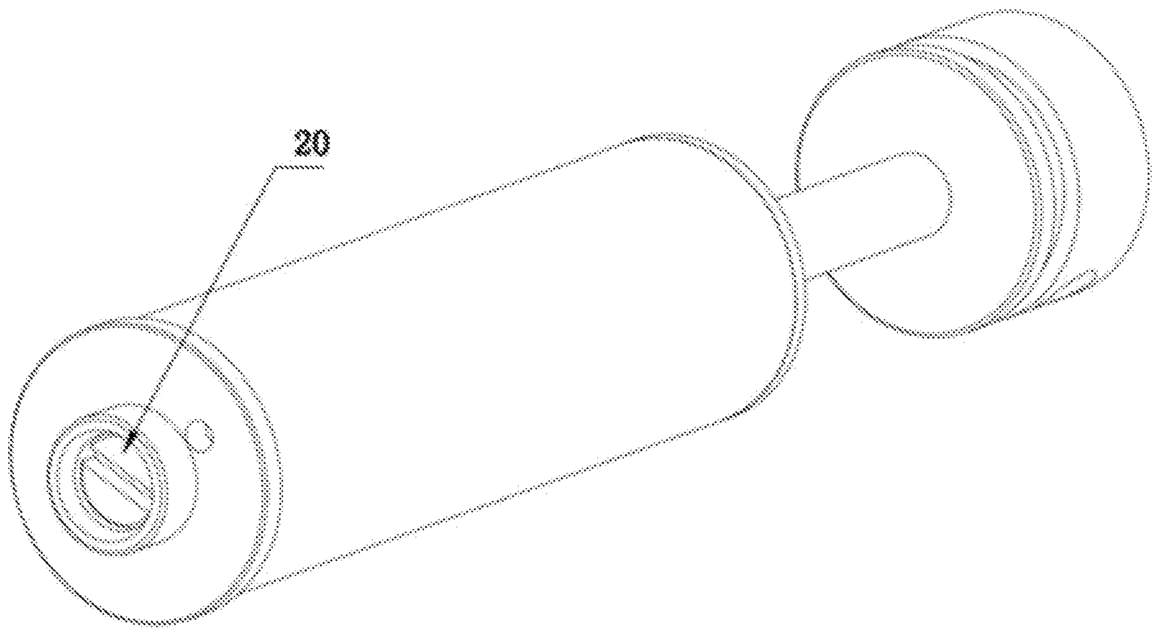
FIG. 7 is a stereogram of a hydraulic rod in Embodiment I of the door closer of the present disclosure.
Figure 8:
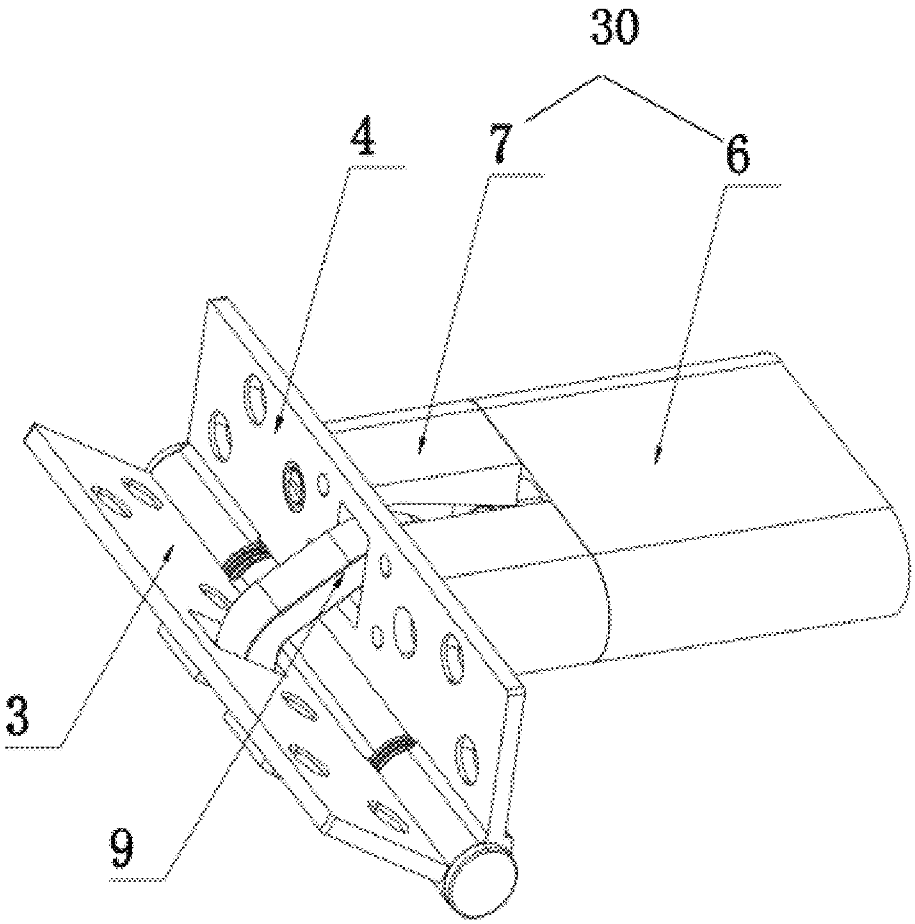
FIG. 8 is a stereogram of Embodiment I of the door closer of the present disclosure in a half open state.
Figure 9:
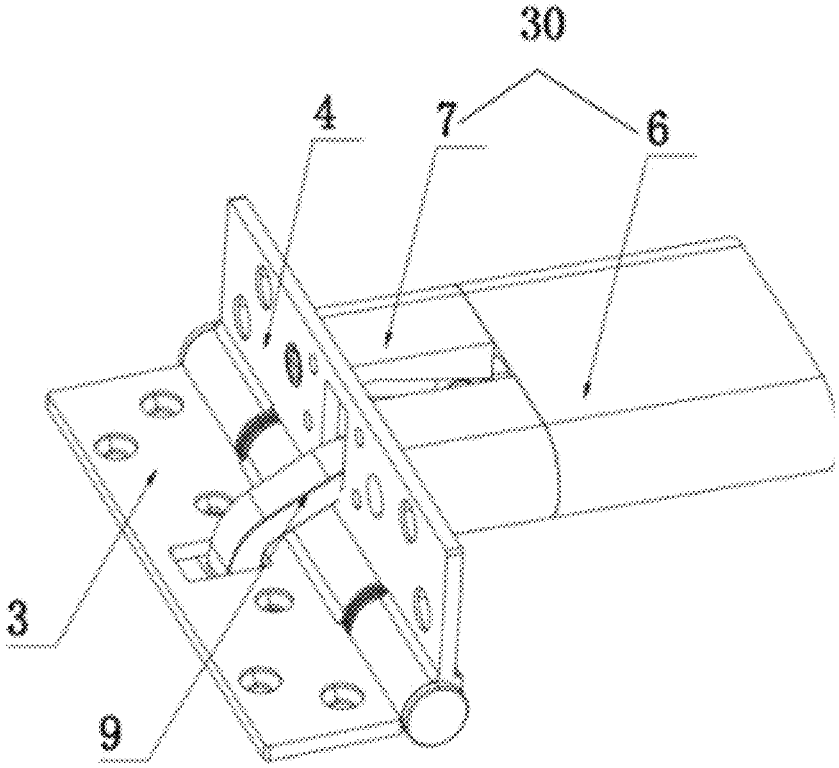
FIG. 9 is a stereogram of Embodiment I of the door closer of the present disclosure in a full open state.

With reference to FIG. 2 and FIG. 3, the door body connecting portion 30 further includes a housing 6 and guide sliding blocks 7 symmetrically mounted at one end of the housing 6, the guide sliding block 7 is used for guiding the sliding of the connecting rod assembly. In this embodiment, the connecting rod assembly is divided into a curved rod 9, a connecting rod 10 and a hinged seat 11, wherein the hinged seat 11 is mounted on a base 8, the connecting rod 10 is hinged to the hinged seat 11, one end of the curved rod 9 is hinged to the connecting rod 10, the other end of the curved rod 9 is connected to the connecting seat 5, the base 8 is fixed to the other end of the housing 6, and the hydraulic rod 1, the connecting rod assembly and the return spring 2 are all mounted on the base 8. The hydraulic rod 1 and the return spring 2 are respectively placed on two sides of the connecting rod assembly, and when the door body is opened, the connecting seat 5 will drive the curved rod 9 to slide along the guide sliding block 7, so that after the connecting rod assembly is driven to move, the base 8 moves therewith, and the base 8 drives the hydraulic rod 1 and the return spring to move and then contract.

With reference to FIG. 4 to FIG. 9, in this embodiment, a first bending portion 18 and a second bending portion 19 are respectively disposed at two ends of the curved rod 9, wherein the first bending portion 18 is hinged to the connecting seat 5, the second bending portion 19 is connected to the connecting rod 10, rolling bearings 12 are symmetrically mounted at the joint of the curved rod 9 and the connecting rod 10, a guide groove 13 is disposed on the guide sliding block 7, the rolling bearing 12 is placed in the guide groove 13, an arc-shaped guide surface 14 for guiding the sliding is disposed on the guide groove 13, and a positioning boss 15 is further disposed on the guide sliding block 7 and can define the position of the rolling bearing 12 so as to position the door body. The positioning boss 15 is further provided with an arc surface, which improves the fixing effect of the positioning boss 15 to prevent the door body from shaking; when a door is opened, the curved rod 9 drives the rolling bearing 12 to slide in the guide groove 13; when moving to the arc-shaped guide surface 14, the rolling bearing 12 moves downwards under the guidance of the arc-shaped guide surface 14, and the rolling bearing 12 is clamped at the positioning boss 15, so that the opened door body is positioned via the rolling bearing 12; when the door is closed, the resistance of the positioning boss 15 is overcome, and the rolling bearing 12 can be pushed into the guide groove 13 again; the rolling bearing 12 returns and rolls in the guide groove 13, at this moment, the hydraulic rod 1 and the return spring 2 return, which pulls the connecting rod assembly to return, so that the door body is pulled by the connecting rod assembly to close automatically, and the hydraulic rod 1 provides a resistance, which plays a buffering role, so as to avoid collision caused when the door body moves too quickly; in this embodiment, a speed regulating switch 20 is disposed on the hydraulic rod 1 and can regulate the resistance of the hydraulic rod 1, a through hole 16 is disposed on the guide sliding block 7, one end of the hydraulic rod 1 and one end of the return spring 2 are placed in the through hole 16, through grooves 17 are symmetrically disposed on the first connecting plate 3 and the second connecting plate 4, and the curved rod 9 passes through the through groove 17 and then is hinged to the connecting seat 5.

Embodiment II

Figure 10:
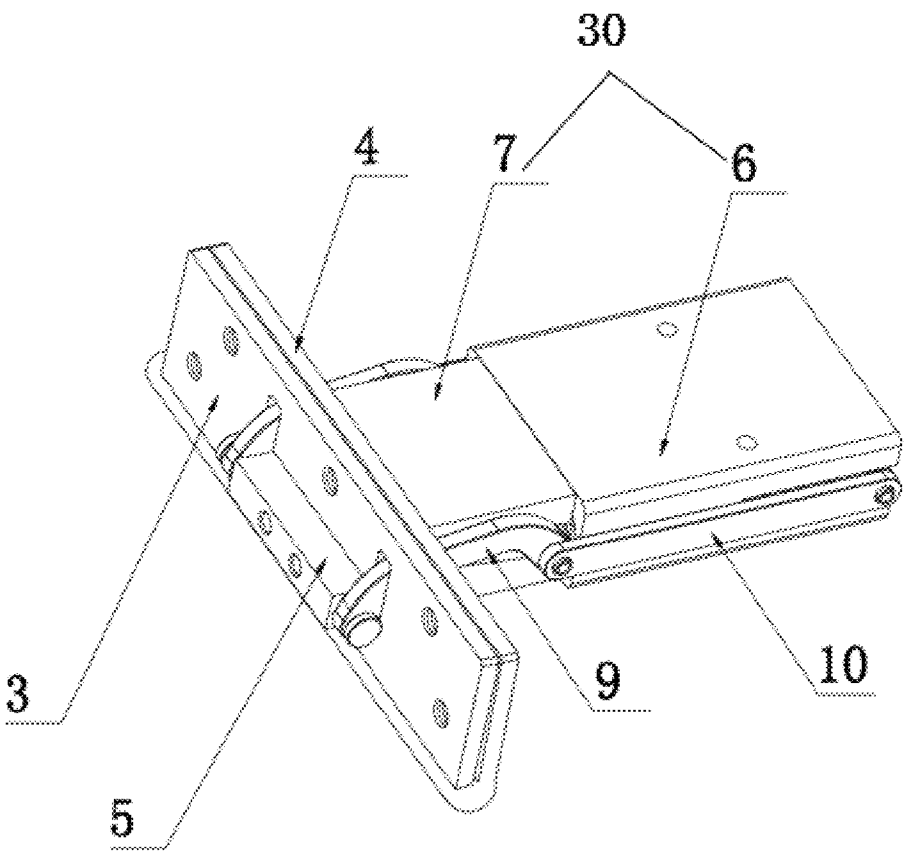
FIG. 10 is a stereogram of Embodiment II of the door closer of the present disclosure in a closed state.
Figure 11:
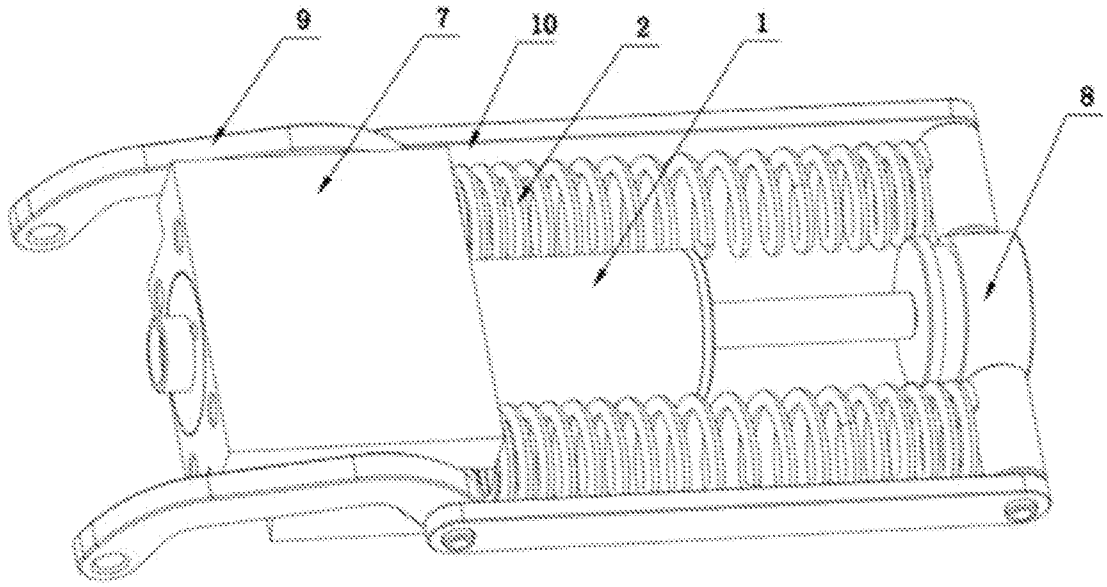
FIG. 11 is a stereogram of an internal structure of Embodiment II of the door closer of the present disclosure.
Figure 12:
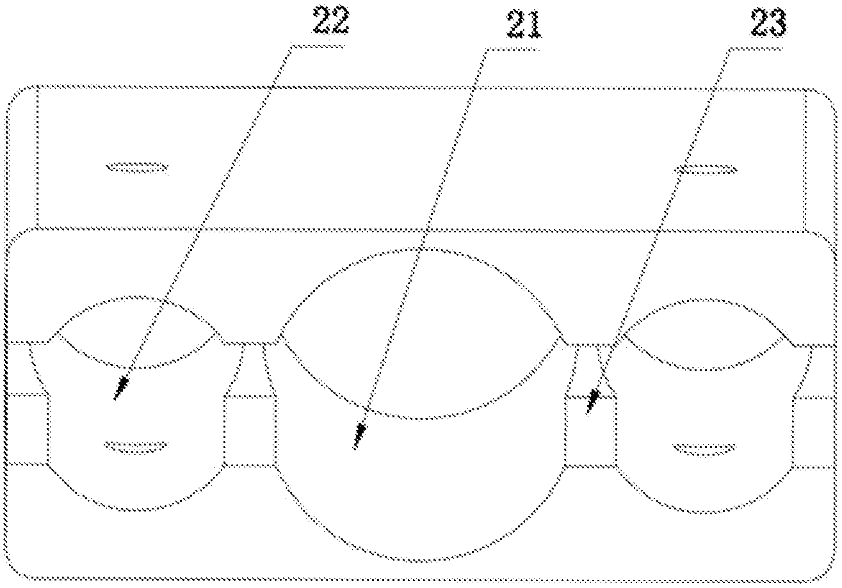
FIG. 12 is a stereogram of a housing in Embodiment II of the door closer of the present disclosure.

With reference to FIG. 10 to FIG. 12, this embodiment differs from Embodiment I in that the return spring 2 is disposed on both sides of the hydraulic rod 1, so as to improve the thrust of the return spring 2 when a door is closed, which helps to automatically close the door body; a first cavity 21 is disposed on the housing 6, and second cavities 22 are symmetrically disposed on two sides of the first cavity 21, wherein the hydraulic rod 1 is placed in the first cavity 21, and the return spring 2 is placed in the second cavity 22; the stability of the hydraulic rod 1 and the return spring 2 can be strengthened by means of the first cavity 21 and the second cavity 22, so as to avoid deflection in the return process; a sliding groove 23 is further disposed on the housing 6, the base 8 is placed in the sliding groove 23, and since the connecting rod assembly is symmetrically disposed on two sides of the housing 6, and the bottom of the connecting rod assembly is connected to the base 8, the base 8 is driven to move by the connecting rod assembly, and then the hydraulic rod 1 and the return spring 2 are driven to contract, therefore the sliding groove 23 helps the base 8 to slide smoothly and steadily, so that the door body is opened and closed smoother.

Embodiment III

Figure 13:
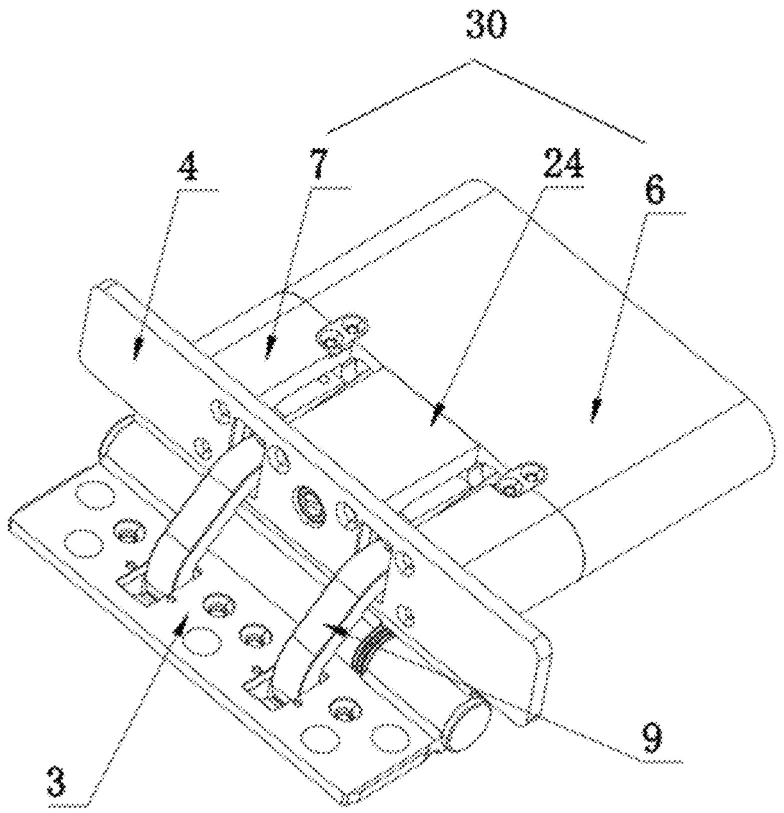
FIG. 13 is a stereogram of Embodiment III of the door closer of the present disclosure in an open state.
Figure 14:
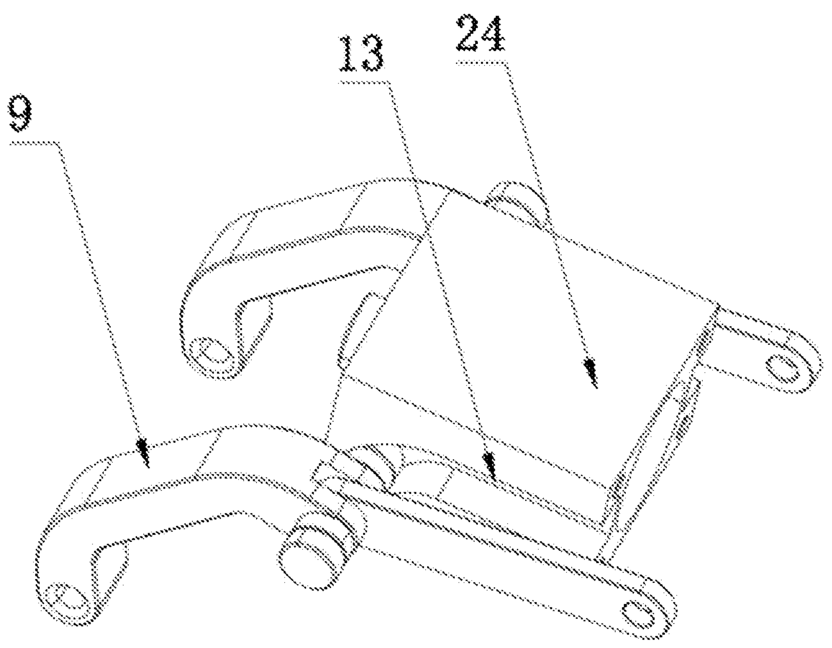
FIG. 14 is a stereogram of a second guide sliding block and a curved rod in Embodiment III of the door closer of the present disclosure.

With reference to FIG. 13 and FIG. 14, this embodiment differs from Embodiment I in that: a second guide sliding block 24 is further disposed between the guide sliding blocks 7, the guide groove 13 is disposed on both sides of the second guide sliding block 24, and by disposing the guide groove 13 corresponding to the guide sliding block 7, the movement track of the rolling bearing 12 is more smooth and steady, and the smoothness during opening and closing the door body is further improved.

According to the door closer of the present disclosure, the connecting seat and the door body connecting portion are respectively mounted on two sides of the first connecting plate and the second connecting plate, the connecting seat and the door body connecting portion are respectively fixed in the door frame and the door body, and disposed in a hidden mode, which does not affect the aesthetic appearance of the door body; the connecting seat and the door body connecting portion are connected via the connecting rod assembly; the guide sliding block is further disposed in the door body connecting portion and can play a guiding role in the movement of the connecting rod; when the door body is opened, the connecting rod is driven to move; at the same time, the connecting rod drives the hydraulic rod and the spring to contract via the base; the positioning boss for positioning is further disposed on the guide sliding block, so that the opened door body can be fixed; and when the door is closed, the hydraulic rod and the spring expand, which can drive the door body to close automatically.

The above described is only preferred implementation modes of the present disclosure and it should be noted that for a person of ordinary skill in the art, a number of improvements and embellishments can also be made without departing from the technical principles of the present disclosure, and these improvements and embellishments shall also be considered within the scope of protection of the present disclosure.

What is claimed is:

1. A door closer, comprising:

a first connecting plate and a second connecting plate, wherein the first connecting plate is connectable to an external door frame, the second connecting plate is connectable to a door body connecting portion, wherein a connecting rod assembly and a return spring are mounted in the door body connecting portion, wherein one end of the connecting rod assembly passes through the second connecting plate and is hinged to the first connecting plate, wherein when a door is opened, an external door body drives the first connecting plate and the second connecting plate to rotate, and after the connecting rod assembly pulls the door body connecting portion, the return spring is compressed, and wherein when the door is closed, the return spring pulls the door body to close automatically, wherein the door body connecting portion further comprises a housing, and a base is mounted in the housing, wherein a plurality of guide sliding blocks are symmetrically disposed at one end of the housing, and the plurality of guide sliding blocks are fixed to the second connecting plate, wherein a hydraulic rod is further mounted in the housing, and wherein a sliding groove is further disposed on the housing, and the base is placed in the sliding groove.

2. The door closer according to claim 1, wherein each of the plurality of guide sliding blocks is provided with a through hole, one end of the hydraulic rod is placed in the through hole, and the other end of the hydraulic rod is connected to the base.

3. The door closer according to claim 2, wherein a hinged seat is fixed to the base, and the connecting rod assembly is hinged to the hinged seat.

4. The door closer according to claim 3, wherein the connecting rod assembly is divided into a curved rod and a connecting rod, and two ends of the connecting rod are respectively hinged to the hinged seat and the curved rod.

5. The door closer according to claim 4, wherein a connecting seat is fixed to the first connecting plate.

6. The door closer according to claim 5, wherein through grooves are symmetrically disposed on the first connecting plate and the second connecting plate, and the curved rod passes through one or more of the through grooves and then is hinged to the connecting seat.

7. The door closer according to claim 4, wherein rolling bearings are symmetrically mounted at a joint of the curved rod and the connecting rod.

8. The door closer according to claim 7, wherein a guide groove is disposed on each of the plurality of guide sliding blocks, and one or more of the rolling bearings are placed in the guide groove, and wherein the guide groove is an oblique guide groove, and an arc-shaped guide surface is disposed on the guide groove.

9. The door closer according to claim 8, wherein a positioning boss is further disposed on each of the plurality of guide sliding blocks, and an arc surface is disposed on the positioning boss.

10. The door closer according to claim 8, wherein a second guide sliding block is further disposed between the plurality of guide sliding blocks, and the guide groove is disposed on both sides of the second guide sliding block.

11. The door closer according to claim 4, wherein a first bending portion and a second bending portion are respectively disposed at two ends of the curved rod.

12. The door closer according to claim 1, wherein a speed regulating switch is disposed on the hydraulic rod.

13. The door closer according to claim 1, wherein the first connecting plate and the second connecting plate are disposed in a hinged mode.

14. The door closer according to claim 1, wherein the return spring is disposed on both sides of the hydraulic rod.

15. The door closer according to claim 1, wherein a first cavity is disposed on the housing, second cavities are symmetrically disposed on two sides of the first cavity, the hydraulic rod is placed in the first cavity, and the return spring is placed in the second cavity.

16. The door closer according to claim 1, wherein the connecting rod assembly includes a plurality of connecting rod assemblies symmetrically disposed on two sides of the housing.

* * * * *